(12) United States Patent
Suzuki

(10) Patent No.: US 7,128,942 B2
(45) Date of Patent: Oct. 31, 2006

(54) VEHICLE TIRE

(75) Inventor: Kazuya Suzuki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 246 days.

(21) Appl. No.: 10/223,652

(22) Filed: Aug. 20, 2002

(65) Prior Publication Data
US 2003/0037854 A1 Feb. 27, 2003

(30) Foreign Application Priority Data
Aug. 21, 2001 (JP) ............... 2001-250648

(51) Int. Cl.
*B60C 13/00* (2006.01)
(52) U.S. Cl. .............. 427/155; 152/524; 156/116; 427/259; 427/417
(58) Field of Classification Search ............... 152/450, 152/524, 525, DIG. 12; 156/116; 427/154, 427/155, 259, 264, 416, 417
See application file for complete search history.

(56) References Cited
U.S. PATENT DOCUMENTS
2,136,567 A    11/1938  Smith
2,849,331 A *  8/1958  Turbolente ............... 427/259
3,114,650 A * 12/1963  Oppenheim et al. ........ 152/524
5,058,648 A   10/1991  Kansupada
5,380,391 A    1/1995  Mahn, Jr.
6,030,676 A    2/2000  Cottin et al.
6,221,453 B1   4/2001  Majumdar

FOREIGN PATENT DOCUMENTS
EP    0873887 A2   10/1998
JP    03239607     10/1991

* cited by examiner

*Primary Examiner*—Geoffrey L. Knable
(74) *Attorney, Agent, or Firm*—Birch, Stewart, Kolasch & Birch, LLP

(57) ABSTRACT

A vehicle tire provided with a protective film which covers a surface of the tire is disclosed, wherein the protective film is indicative of at least one of tire data including tire conicity and radial force variation of the tire and can be washed away with water. Also a method of fitting tires on a vehicle is disclosed, wherein the installing positions of the tires are determined according to the data indicated by the protective film, and thereafter the protective film is washed away with water.

7 Claims, 3 Drawing Sheets

VEHICLE TIRE

The present invention relates to a vehicle tire, more particularly to a tire covered with a protective film which is indicative of tire data such as tire conicity and RFV and removable by washing with water.

To provide high quality tires is the objective of tire manufacturers. Thus, the manufacturers make every effort to produce high quality tires, and variations of tire characteristics are decreasing. However, it is almost impossible to completely eliminate such variations. Therefore, if the variations are lower than the maximum allowable limits in outgoing inspection, the tire is shipped as nondefective.

For example, radial force variation (RFV) and tire conicity are characteristics of a tire which affect high-speed performance of the vehicle. The radial force variation (RFV) generates vibration on the axle, and causes vibrations (shimmy) of the vehicle body, steering wheel and the like. The tire conicity generates a side force towards one direction independently from the tire rotating direction and causes a vehicle's drift. At the same time, there is a possibility that such adverse effects can be minimized by properly selecting the positions of the tires in the vehicle, for example, the positions of the four tires of a passenger car. Thus, tire data such as the direction of the conicity force, the magnitude of RFV and the like are necessary at the time of installing the tires. But, if once the tires are installed properly, such data become not necessary because the tire data especially conicity and RFV are liable to change during use and such data are subject to misinterpretation of the user.

On the other hand, it is also important to prevent the occurrence of defective in transit and storage by stain, scratch, abrasion and the like.

It is therefore, an object of the present invention to provide a tire, in which a protective film which is indicative of tire data such as tire conicity and RFV and can be washed away with water is provided to cover a surface of the tire, thereby being capable of preventing the surface from abrasion and the like in transit and storage and being capable of providing information for installing the tire proper positions.

According to the present invention, a vehicle tire is provided with a protective film which covers a surface of the tire and is indicative of at least one of tire data including tire conicity and radial force variation of the tire, and the protective film can be washed away with water.

Embodiments of the present invention will now be described in detail in conjunction with the accompanying drawings.

Figure 1:
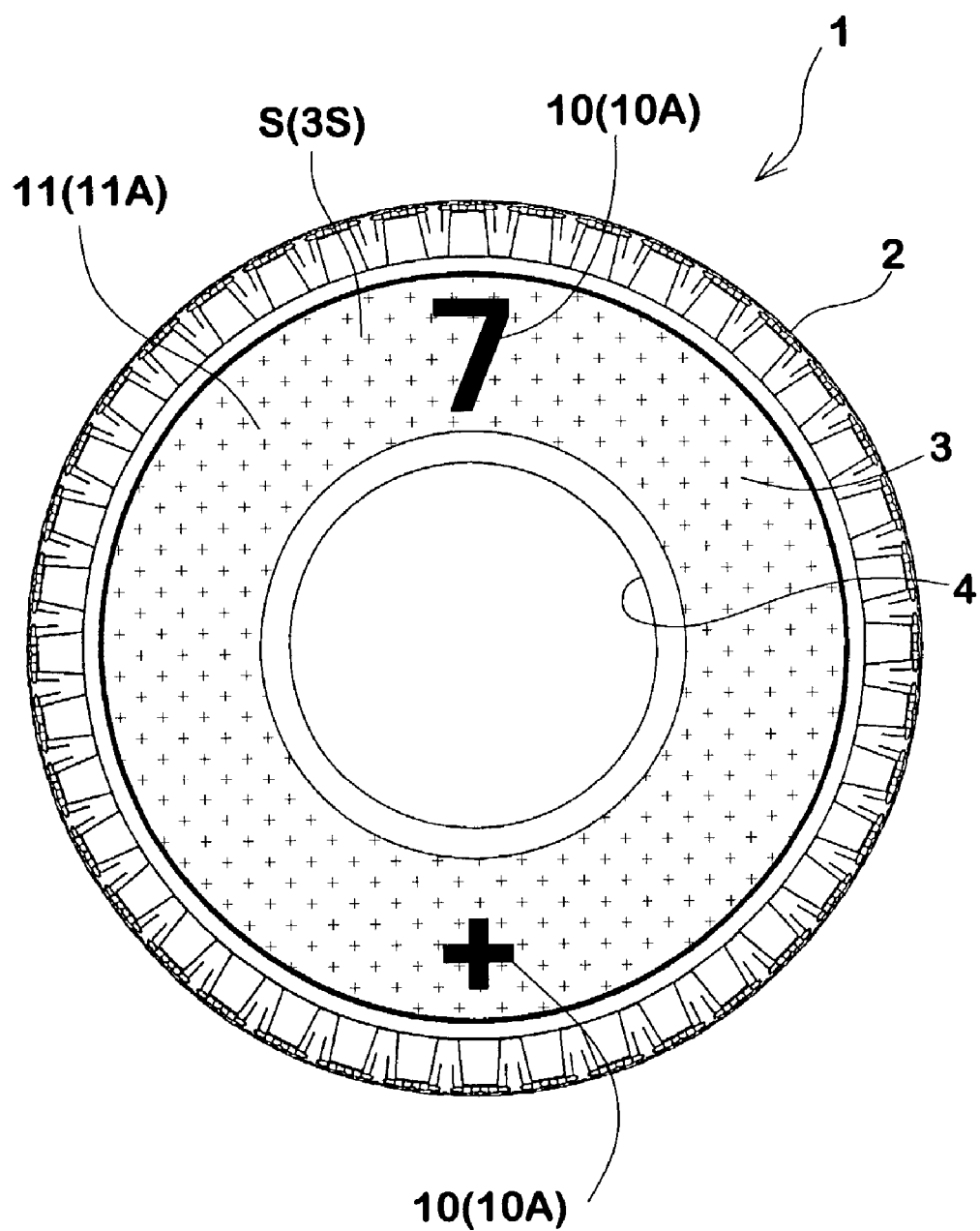
FIG. 1 is a side view of a pneumatic tire according to the present invention.

In the drawings, tire 1 according to the present invention comprises a tread 2, a pair of axially spaced beads 4 and a pair of sidewalls 3 therebetween.

For instance, the tire 1 is a pneumatic tire for passenger car which is laid down and piled up in transit and storage. Therefore, in order to protect the sidewalls 3 from abrasion, the almost entirety of the surface 3S thereof (an annular area filled with a multi-cross pattern shown in FIG. 1) is covered with a protective film 11. Aside from the prevention of abrasion, in case of white letter tire, the protective film 11 can be utilized for preventing the white letters from changing in color due to chemicals such as age resistor and the like coming from the adjacent tire.

Here, it is important that the protective film 11 can be washed away with water. The protective film 11 is formed by applying a overcoat paint 11A using a brush, sprayer or the like after the undermentioned mark 10 is printed. Therefore, as the overcoat paint 11A, the following water-soluble paint is preferably used for the removability, film strength, safety, handling, cost and the like.

The water-soluble paint comprise polyvinyl resin as a film-forming material, water as a solvent, colorant, and surface-active agent. For the polyvinyl resin, acrylic modified polyvinyl resin (such as polyacrylic acid, polymethyl acrylate, polyethyl acrylate, polymethyl methacrylate and polyethyl methacrylate) and polyvinyl alcohol acetate are preferably used for the high solubility in water. The main purpose of the colorant is to visualize the protective film 11 in order to make it easy to completely remove or wash away the film. Other purposes may be to improve the appearance, to protect from the sunlight, and to make it easy to check the presence and degree of the abrasion and contact. The surface-active agent is added as a dispersant for the film materials and in order to improve the application of the paint.

In order to prevent runs and drops of the paint during applying and to form the protective film 11 having a uniform thickness, the solid content of the film forming material (in this example, polyvinyl resin) is set in a range of 10 to 20 parts by weight with respect to 100 parts by weight of the solvent (in this example, water). Preferably, the thickness of the protective film 11 is in a range of from 0.1 to 1.0 mm, more preferably 0.3 to 0.8 mm.

The above-mentioned mark 10 is indicative of a tire data. AS the tire date, tire conicity, RFV and the like measured in outgoing inspection may be listed.

The mark 10 is formed by an undercoat 10A, and the undercoat 10A is formed on the sidewall surface 3S before the overcoat paint 11A is applied.

Example (I) of Undercoat 10A:

The undercoat 10A is formed by applying an oily substance. In this case, the undercoat 10A is an almost invisible film of the oily substance. AS the film repels the overcoat paint 11A, the mark 10 which is readily visible appears by applying the overcoat paint 11A thereon as being a part devoid of the overcoat paint 11A and being of a black color. When the overcoat paint 11A is washed away after served its purpose, the mark 10 accordingly disappears. For the oily substance, vegetable oil and fat, animal fat and oil, and the like can be suitably used. Especially, vegetable oil which is in liquid form at room temperature such as olive oil is preferably used because it is environment-friendly, odor-free and low-cost, and further it is easy to apply due to low viscosity.

Example (II) of Undercoat 10A:

The undercoat 10A is formed by applying a colored water-soluble paint which is the substantially same as the above-mentioned overcoat paint 11A. In this case, the total film thickness is increased by the overcoat in the position of the mark 10. As a result, the mark 10 appears like an emboss mark. When the overcoat paint 11A is washed away, then the undercoat 10A is also washed away and the mark 10 disappears.

Example (III) of Undercoat:

The undercoat 10A is formed by applying a water-soluble paint which is different from the overcoat paint 11A. For instance, the difference therebetween may be the color or colorants of the overcoat paint 11A and the undercoat paint (10A).

In case of different colorants, it is preferable that the undercoat paint is a dark color and the overcoat paint is a light color.

Further, it is also possible to use chemicals instead of the colorants or alternatively together with the colorants. Such chemicals are: an electron-releasing color-forming organic chemical for example known as dye, which is added in one of the undercoat paint (10A) and the overcoat paint 11A (preferably in the overcoat paint 11A); and an electron-accepting color developer which is added in the other, whereby the mark 10 becomes a different color from the surrounding color when the overcoat paint 11A contacts with the undercoat 10A and they react with each other. AS the color-forming chemical, a phthalide type or fluoran type or spiropyran type color-forming chemical is used in combination with acid as the developer, for example organic acid such as citric acid tartaric acid or inorganic acid.

Aside from the above-mentioned combination of the dye and developer, a combination of a pH indicator such as phenolphthalein and an acid or alkali substance may be also used.

In any case, when the overcoat paint 11A is washed away, then the undercoat 10A is also washed away and the mark 10 disappears.

As to the method of indicating the tire date, there are various ways as follows.

In case of tire conicity, the direction of the conicity force should be indicated by the mark 10.

Method (1): A graphic symbol. e.g. circle and the like, of 5 to 30 mm in diameter or width is provided on the sidewall surface 3S on the leading side in the direction of the conicity force.

Method (2): A symbol such as plus (+) or minus (−) indicating the direction of the conicity force is provided on the surface 3S. For example, when one of the sidewalls 3 is provided with the tire manufacturer code, production number and the like and the other sidewall 3 is not provided with such information, the symbol may be provided on only the former, and the symbol plus (+) is used if the conicity force direction is from the latter to the former sidewall, and accordingly, if the direction is reverse thereto, the symbol minus (−) is used.

In case of RFV,

Method (3): the absolute value of RFV is printed in figure(s), or

Method (4): a relative value of RFV such as rank number (for example, ten ranks) is printed in figure(s).

The latter is preferable rather than the former because it may be convenient for the worker to fitting the tires to a car. In FIG. 1, a numerical character "7" is indicated as a rank number in ten ranks.

Use of Indicated Tire Data

First, a tire which is suitable for each wheel of the vehicle is selected according to the data indicated by the protective film.

For example, in case of a vehicle having two steering wheels (front wheels) and two driving wheels (rear wheel) such as passenger car, tires having small RFV are mounted on the steering wheels, and tires having larger RFV are mounted on the driving wheel.

Figure 2A:
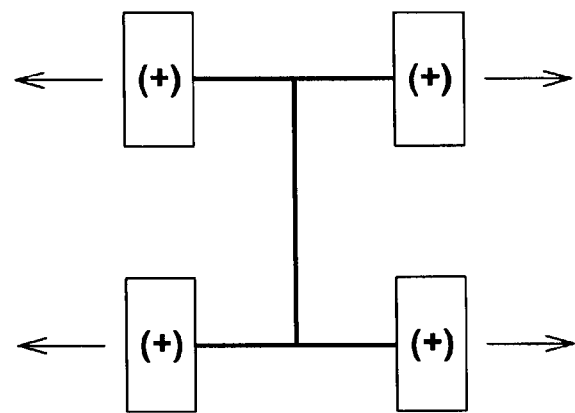
FIGS. 2a, 2b and 2c show tire arrangements which can minimize the adverse affect of tire conicity.
Figure 2B:
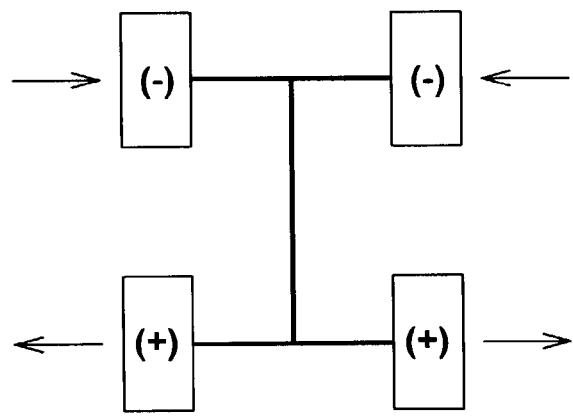
Figure 2C:
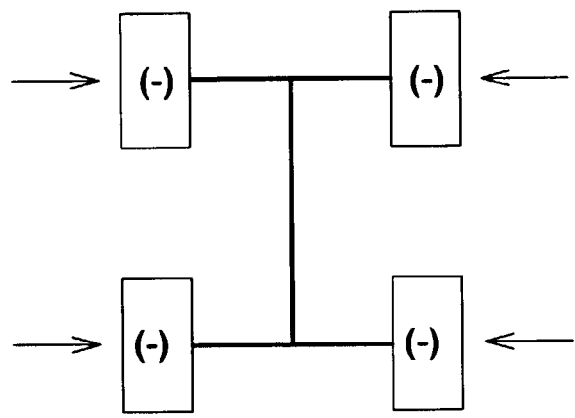
Figure 3:
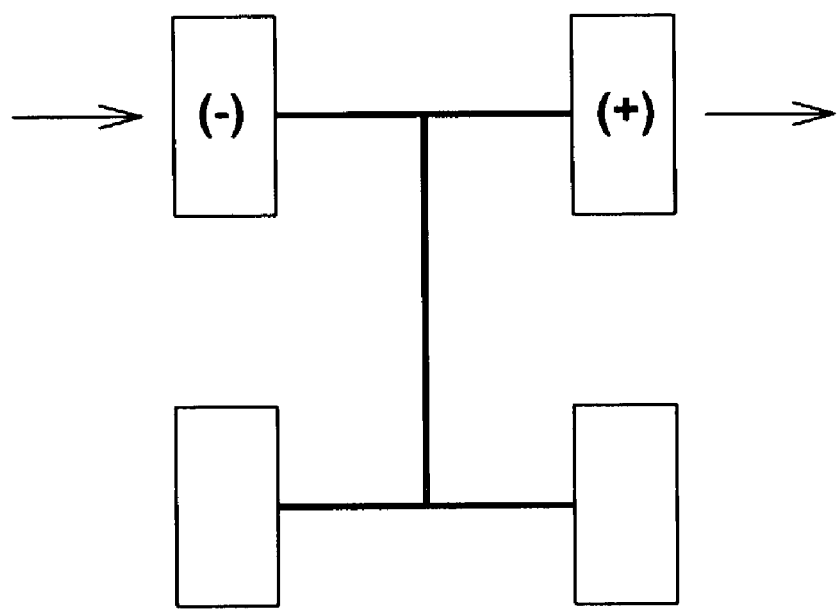
FIG. 3 show a tire arrangement in which there is a possibility of the adverse affect being maximized.

In case of the tire conicity, on a pair of a right wheel and a left wheel (front wheels, and rear wheels), two tires selected as follows are installed as shown in FIGS. 2a, 2b and 2c. The conicity force from the right tire and the conicity force from the left tire ideally cancel out or totally decrease. In other words, the conicity forces are directionally opposite and numerically close to each other. If as shown in FIG. 3, the direction of the right tire is the same as the direction of the left tire, the wheels become liable to cause drift towards such direction.

When all the tires are installed, the protective film is removed by washing with water so that the tire date disappears.

The invention claimed is:

1. A vehicle tire comprising
a pair of sidewalls each provided with a protective film which covers a substantially entire surface of the tire sidewall, wherein
the protective film is provided with a mark indicating at least one of tire data including tire conicity and radial force variation of the tire, and
the protective film is formed by first painting the mark on the surface of the sidewall with oily substance, and then applying a water-soluble overcoat paint to the entirety of the surface of the sidewall so that the oily substance repels the water-soluble paint and forms the mark as a part being devoid of the water-soluble paint,
whereby the protective film itself is indicative of said at least one of tire data including tire conicity and radial force variation of the tire and the protective film can be washed away with water.

2. The vehicle tire according to claim 1, wherein
the water-soluble overcoat paint includes polyvinyl resin, colorant, surface-active agent and water.

3. The vehicle tire according to claim 1, wherein the thickness of the protective film is in a range of from 0.1 to 1.0 mm.

4. The vehicle tire according to claim 1, wherein the thickness of the protective film is in a range of from 0.3 to 0.8 mm.

5. The vehicle tire according to claim 1, wherein the tire data is a direction of a conicity force of the tire.

6. The vehicle tire according to claim 1, wherein the tire data is a magnitude of RFV of the tire.

7. A method of fitting the tires according to claim 1 on a vehicle,
the tires each provided with a protective film covering a surface of the tire and being indicative of a data of the tire, and the method comprising
selecting a tire from the tires which is suitable for each wheel of the vehicle according to the data indicated by the protective film, and
removing the protective film by washing with water so that the tire data disappears.

* * * * *